(No Model.)
F. COSSIN.
MECHANICAL TOY.
No. 454,927. Patented June 30, 1891.
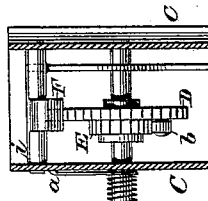
Fig. 4.
Fig. 2.
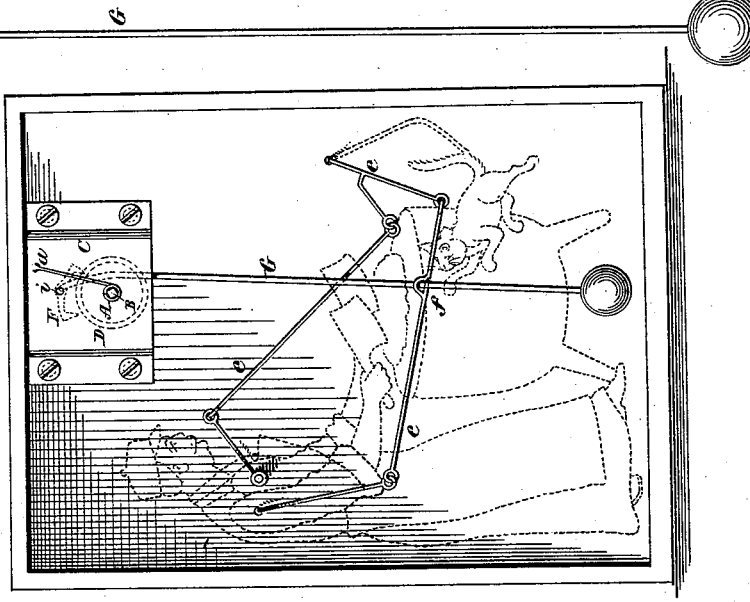
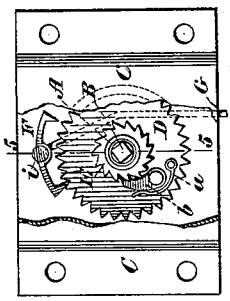
Fig. 3.
Fig. 1.
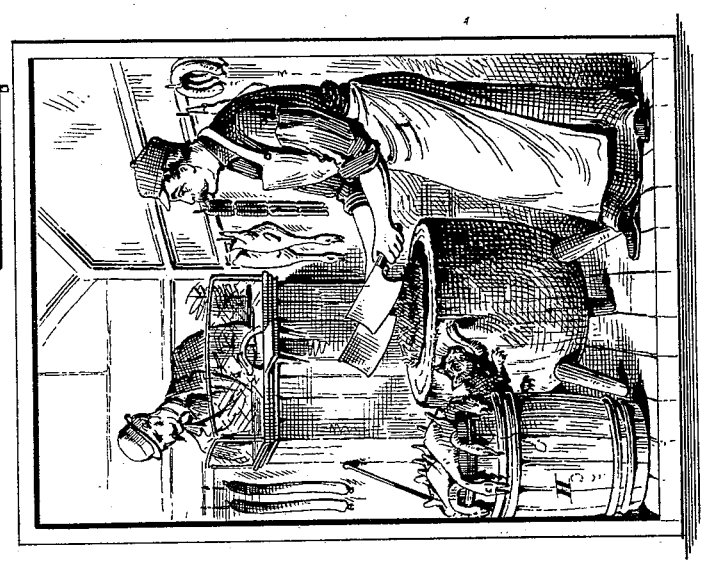
WITNESSES:
Gustave Dieterich
R. C. Mitchell
Fig. 5.
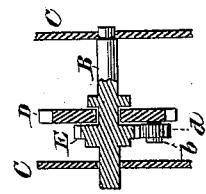
INVENTOR
Francis Cossin
BY Briesen & Knauth
his ATTORNEYS.
THE NORRIS PETERS CO., PHOTO-LITHO., WASHINGTON, D. C.

UNITED STATES PATENT OFFICE.

FRANCIS COSSIN, OF NEW YORK, N. Y., ASSIGNOR TO LEO. SCHLESINGER, OF SAME PLACE.

MECHANICAL TOY.

SPECIFICATION forming part of Letters Patent No. 454,927, dated June 30, 1891.

Application filed February 4, 1891. Serial No. 380,141. (No model.)

*To all whom it may concern:*

Be it known that I, FRANCIS COSSIN, a resident of the city, county, and State of New York, have invented a new Mechanical Toy, of which the following is a specification.

The object of my invention is to provide a simple mechanical movement by which figures or other devices may be caused to move. This mechanism consists of a peculiar spring, also of its combination with an escapement-wheel, escapement, and pendulum, as hereinafter described, and, further, in combining the pendulum-rod directly with levers, transmitting the swinging motion of the pendulum to toy figures or other devices, all as hereinafter more fully described.

The accompanying drawings clearly illustrate my invention.

Figure 1 is a face view of a mechanical toy, showing the figures to be moved. Fig. 2 is a rear view of my mechanical toy, showing the pendulum and figure-connecting levers, the figures being shown in dotted outline. Fig. 3 is a rear view of the pendulum actuating and regulating mechanism. Fig. 4 is a side elevation of the same, partly in section; and Fig. 5 is a longitudinal section on line 5 5, Fig. 3.

Similar letters refer to similar parts.

A is a spring coiled spirally around the arbor B, one end of this spring being immovably fastened to the frame C, (in which said arbor has its bearings,) as indicated at $a$, the other end being securely fastened to the arbor B. It will be seen that the spring, being thus coiled spirally around the arbor and fastened to its stationary frame, needs no outer casing, as heretofore, and will still serve to revolve the arbor and to allow the same to be wound by a key applied to the squared end of said arbor. Upon this arbor is loosely hung the escapement-wheel D, and at a point on said arbor adjacent to said escapement-wheel is firmly mounted the ratchet-wheel E, of smaller diameter than D. Upon the side of the wheel D is pivoted a pawl $b$, the end of which engages with the ratchet-wheel E, said pawl being pressed against the ratchets by a spring $d$. Playing in the teeth of the escapement-wheel in the ordinary manner is the escapement-anchor F, which is secured to the same arbor $i$ with the pendulum G. A system of links or levers $e$ $e$ connects (as it occurs in this illustration) the arms of a meat-chopper and a cat with the pendulum-rod G, these levers causing the chopper to alternately work and the cat to alternately jump toward the chopper and retreat with each stroke of the pendulum, one of these positions being shown by Fig. 1.

The links or levers $e$ $e$ are actuated by the pendulum G, which runs through a loop $f$, Fig. 2, on one of the said links or levers $e$. It is obvious that all sorts of different figures may be moved by this pendulum, and that to a certain degree a mechanical power may be transmitted from the pendulum of such a device in the same manner.

The escapement-wheel D, being loosely carried upon the arbor B, allows the arbor B, which carries the spring A, to be wound without interfering with the wheel D and anchor F. After the spring has been wound it will in its endeavor to unwind impart motion to the arbor B, thereby turning the ratchet-wheel E, which through the medium of the pawl $b$ transmits motion in the desired direction to the escapement-wheel D as fast as the escapement-anchor and the pendulum will permit. Heretofore in mechanisms of this kind it has been common to use a convolutely-coiled spring, one end of which is fastened to a winding-arbor and the other end attached to a drum, the uncoiling of the spring rotating the drum, which transmits its motion to the escapement-wheel, while the arbor remains stationary. In my invention I utilize the spring coiled spirally around a portion of the winding-arbor, one end of which spring is fastened to the stationary frame-work, while the other end is attached to the arbor, so as to rotate the winding-arbor itself by the unwinding of the spring. It will thus be seen that I do entirely away with the drum and utilize the winding-arbor not only to tighten the spring, but to rotate the escapement-wheel.

Having now described my invention, I claim—

1. The combination of the winding-arbor B, the spring A, coiled spirally around said arbor B, the fixed frame C, to which one end of said spring is secured, the escapement-wheel D, hung loosely upon said arbor B, and the ratchet-wheel E, mounted upon said arbor, with the pawl b and with the anchor F and its arbor i, and the pendulum G, the pendulum-rod being directly secured to said arbor i and free to swing fully on its connection with said arbor i, substantially as described.

2. The combination, in a mechanical toy, of movable figures connected by links or levers e e with the pendulum G and with means, substantially as described, for moving said pendulum, the said links or levers e e connecting directly with said pendulum between its arbor i and its ball or weight, substantially as herein shown and described.

FRANCIS COSSIN.

Witnesses:
HARRY M. TURK,
GUSTAV SCHNEPPÉ.